(12) United States Patent
Thompson

(10) Patent No.: US 6,883,166 B1
(45) Date of Patent: Apr. 19, 2005

(54) METHOD AND APPARATUS FOR PERFORMING CORRECTNESS CHECKS OPPORTUNISTICALLY

(75) Inventor: Carol L. Thompson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 480 days.

(21) Appl. No.: 09/717,570

(22) Filed: Nov. 21, 2000

(51) Int. Cl.$^7$ .................................................. G06F 9/45
(52) U.S. Cl. ........................................................ 717/161
(58) Field of Search ................................. 717/126–131, 717/151–154, 158–161; 712/219; 714/35

(56) References Cited

U.S. PATENT DOCUMENTS

| | | | | |
|---|---|---|---|---|
| 5,265,254 A | * | 11/1993 | Blasciak et al. ............. | 717/130 |
| 5,551,001 A | * | 8/1996 | Cohen et al. ................ | 711/122 |
| 5,644,709 A | * | 7/1997 | Austin .......................... | 714/53 |
| 5,758,061 A | * | 5/1998 | Plum ............................ | 714/35 |
| 5,787,286 A | * | 7/1998 | Hooker ........................ | 717/130 |
| 6,275,929 B1 | * | 8/2001 | Blum et al. .................. | 712/219 |
| 6,526,421 B1 | * | 2/2003 | Houldsworth ................ | 707/206 |

* cited by examiner

*Primary Examiner*—Kakali Chaki
*Assistant Examiner*—Tuan Anh Vu

(57) ABSTRACT

A method and an apparatus that enable spare instruction slots within a code module to be utilized opportunistically for insertion of instructions associated with correctness check functions. The apparatus comprises a compiler that generates code and an initial instruction schedule. During generation of the initial instruction schedule, the compiler ignores code sequences associated with correctness check functions. After the initial instruction schedule has been generated, the compiler examines the initial instruction schedule and determines locations of spare instruction slots in the initial instruction schedule that can potentially be utilized for insertion of the code sequences associated with the correctness checks. The code sequences associated with the correctness checks are then inserted into the instruction schedule to the extent that insertion of the code sequences does not lengthen the final instruction schedule. Consequently, no performance penalty is incurred at run time.

15 Claims, 5 Drawing Sheets

INITIAL SCHEDULING

INITIAL INSTRUCTION SCHEDULE 10

CHECK CODE SEQUENCES

METHOD AND APPARATUS FOR PERFORMING CORRECTNESS CHECKS OPPORTUNISTICALLY

TECHNICAL FIELD OF THE INVENTION

The present invention relates to a method and an apparatus for performing correctness checks opportunistically, wherein spare instruction slots within a code module are utilized for the code associated with the correctness checks.

BACKGROUND OF THE INVENTION

When software is developed, the software developer often includes calls to assert functions at certain locations in the source code. When the software program is compiled and executed, the assert functions will be evaluated by the compiler. An assert function is a Boolean statement used in a computer program to test a condition that, if the program is operating correctly, should always evaluate to a certain logic level (e.g., should always evaluate as true or should always evaluate as false). Therefore, if the tested condition evaluates to another logic level, then the assertion test fails, and it is known that an error in the execution of the program has occurred. When an assertion test fails, the program is typically terminated, and an appropriate error message is generated.

Generally, when developing the source code, the developer specifies that the assertions will either all be on or all be off. If the developer specifies that the assertions are all to be off, the compiler will ignore all of the assert functions when generating the instruction schedule. Consequently, at run time, none of the code associated with the assert functions will be executed. Therefore, none of the assert functions will be evaluated. On the other hand, if the developer specifies that all of the assertions are to be on, the compiler will insert all of the code associated with all of the assert functions into the instruction schedule, regardless of whether or not inserting the assert function code sequences will lengthen the final instruction schedule and thus result in a performance penalty at run time. This is true even in cases where spare instruction slots exist in the initial instruction schedule that would enable at least some of the assert function instructions to be inserted into the schedule without lengthening the schedule.

A function that is typically referred to as a correctness check function is similar to the assert function. Correctness checks are often included in the source code by the developer at locations in the source code where it is desirable to ensure that a value, a range of values, or a relationship between values is correct at a particular point in the code. At run time, the code associated with the correctness check is evaluated. If the result of the evaluation resolves to a non-zero value, then the value, range of values, or relationship between values being evaluated is deemed to be correct.

As with assert functions, simply inserting the code associated with correctness checks into the instruction schedule will result in lengthening the instruction schedule in cases where the number of spare slots existing in the instruction schedule is less than the number of slots needed to accommodate the instructions associated with the correctness checks. Consequently, a performance cost will be realized when the program is executed at run time.

It would be desirable to provide a technique that would enable spare instruction slots existing in the initial instruction schedule to be utilized opportunistically for instructions associated with functions such as assert functions and correctness check functions in such a way that a performance penalty would not be incurred at run time. In other words, it would be advantageous to provide a way in which the instructions associated with such functions could be inserted into the instruction schedule to the extent that inserting the instructions does not lengthen the instruction schedule. In this way, at least some of the instructions associated with such functions could be executed at run time without necessarily causing a performance cost to be incurred. Accordingly, a need exists for a method and an apparatus that enable these types of functions to be performed by using spare instruction slots within a code module opportunistically.

SUMMARY OF THE INVENTION

The present invention provides a method and an apparatus that enable spare instruction slots within a code module to be utilized opportunistically for insertion of instructions associated with correctness check functions. The apparatus of the present invention comprises a compiler, which may be comprised solely as hardware or as a combination of hardware and software. The compiler performs code generation and generates an initial instruction schedule. During the generation of the initial instruction schedule, the compiler ignores code sequences associated with correctness check functions. After the initial instruction schedule has been generated, the compiler examines the initial instruction schedule and determines locations of spare instruction slots in the initial instruction schedule that can potentially be utilized for insertion of the code sequences associated with the correctness checks. The code sequences associated with the correctness checks are then inserted into the instruction schedule to the extent that insertion of the code sequences does not lengthen the final instruction schedule. Consequently, no performance penalty is incurred at run time.

In accordance with the preferred embodiment of the present invention, the developer writes the source code check sequences so that they are treated as conditions by the compiler. The developer also specifies that the correctness checks are to be performed opportunistically. Once the compiler has performed initial code generation, the compiler will generate an initial instruction schedule utilizing the main instruction stream. The compiler will treat the code associated with the correctness checks specially since the correctness checks are written in the source code as conditions. Therefore, the instructions associated with the correctness checks will not be utilized by the compiler when generating the initial instruction schedule. In essence, by specifying that the correctness checks are conditions when developing the source code, the compiler is informed that the main instruction stream is to be kept separate from the instruction stream associated with the correctness checks when generating the instruction schedule. Therefore, the compiler will only utilize the main instruction stream when generating the initial instruction schedule.

Once the initial instruction schedule has been generated, the compiler analyzes the initial instruction schedule and determines where spare instruction slots exist in the initial instruction schedule. The compiler then determines which correctness check code sequences can be inserted into certain spare instruction slots. The correctness check code sequences are then inserted into the appropriate spare instruction slots to the extent that they can be inserted without lengthening the instruction schedule. Thus, at run time, the correctness checks corresponding to the code sequences that were inserted into the spare instruction slots of the instruction schedule will be executed along with the main code sequences without a performance penalty resulting.

These and other features and advantages of the present invention will become apparent from the following description, drawings and claims.

DETAILED DESCRIPTION OF THE INVENTION

Figure 1:
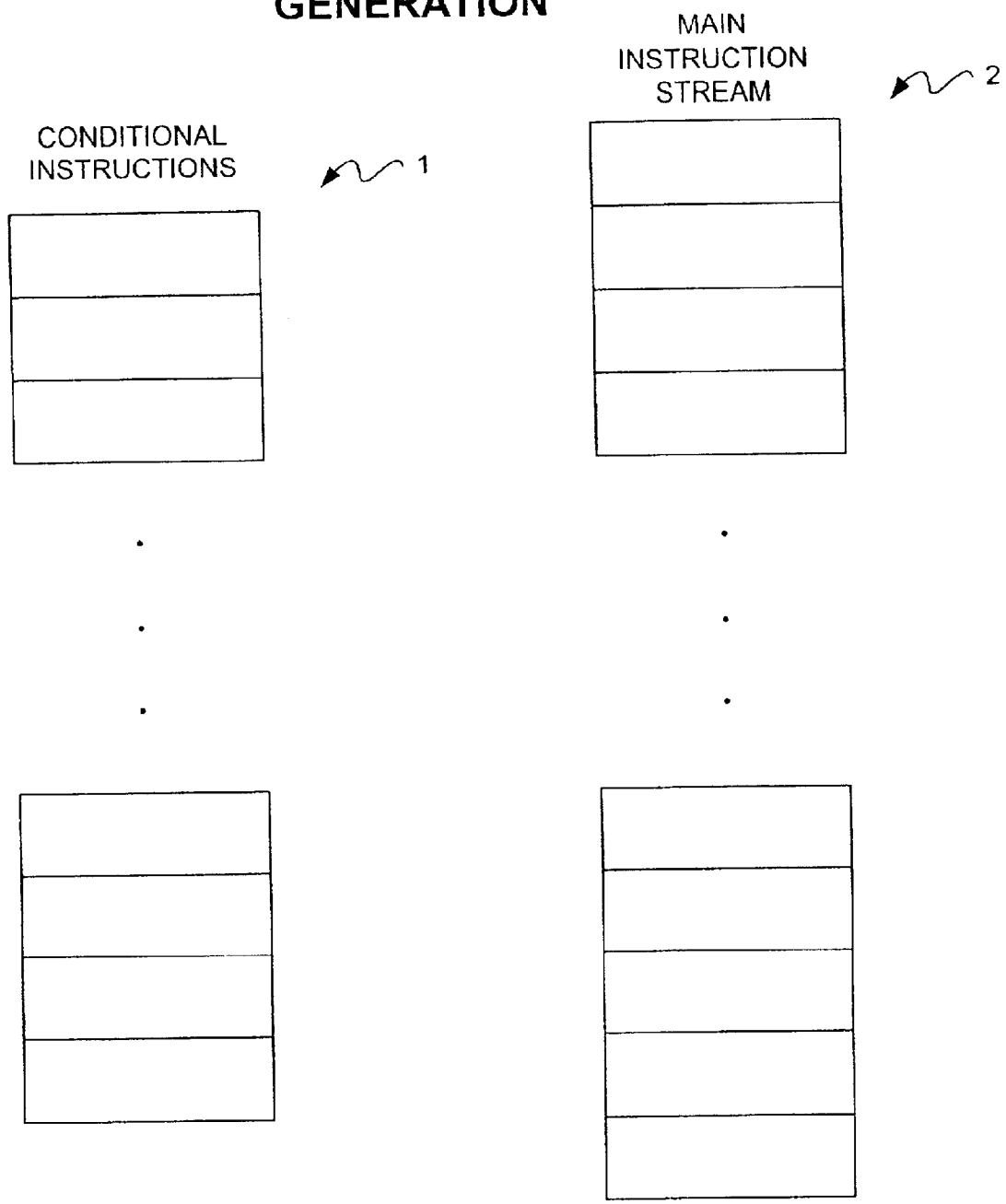
FIG. 1 illustrates the result of performance of initial code generation by the compiler of the present invention during which conditional instructions are kept separate from the main instruction stream.

In accordance with the preferred embodiment of the present invention, when correctness check functions are expressed in the source code by the developer, the correctness check functions are expressed as conditions. When compilers perform initial code generation, the instructions associated with conditions are kept separate from the main instruction stream. By expressing the correctness checks as conditions in the source code, it is ensured that the instructions associated with the correctness checks will not be contained in the main instruction stream once initial code generation has been performed. This is illustrated in FIG. 1, which shows a stream of conditional instructions that is separate from the main instruction stream 2.

Although the present invention is described herein in relation to utilizing spare instruction slots for code sequences associated with correctness check functions, it should be noted that the present invention is not limited to this particular implementation. As stated above, assert functions and correctness check functions have similarities in terms of the manner in which they are evaluated. Therefore, the present invention could also opportunistically use spare instruction slots for code sequences associated with assert functions. Furthermore, those skilled in the art will understand the manner in which the techniques of the present invention can be utilized with other types of functions for which it would be advantageous to opportunistically utilize spare instruction slots in the instruction schedule in such a way that performance penalties are not incurred at run time. Therefore, the following discussion of the present invention as it relates to correctness check functions should be viewed as an exemplary and preferred embodiment of the present invention and not as an exclusive implementation of the present invention.

Figure 2:
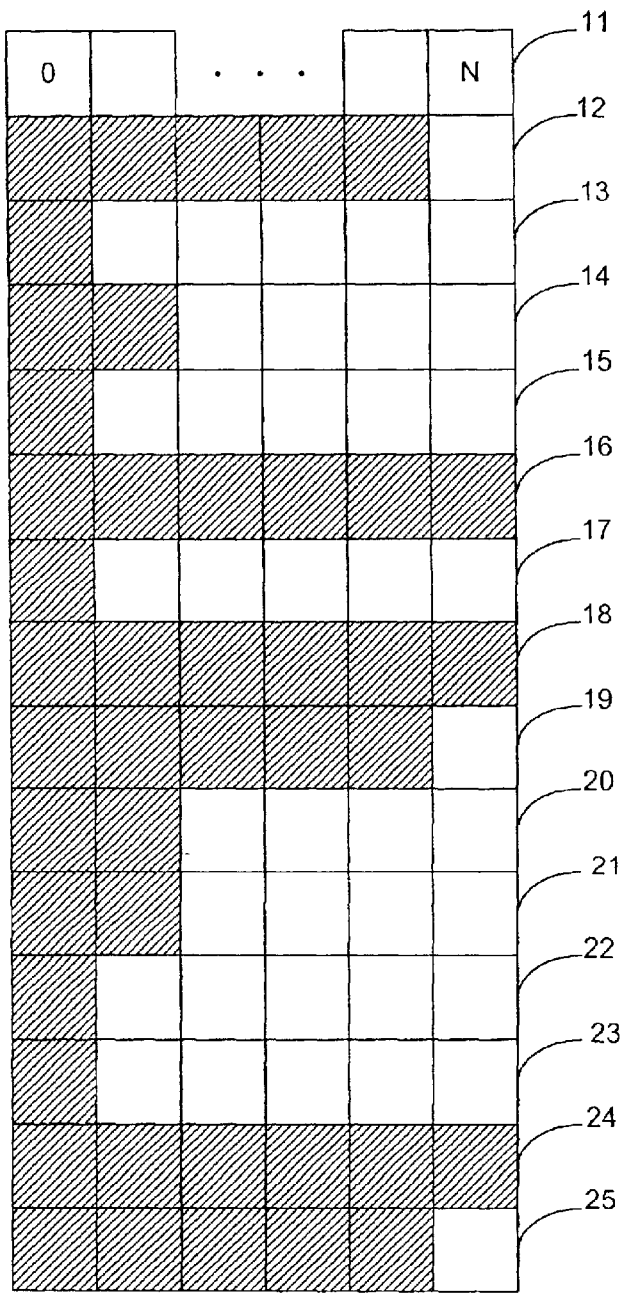
FIG. 2 illustrates the result of performance of initial instruction scheduling by the compiler of the present invention and shows spare instruction slots in the initial instruction schedule that may or may not be utilized for insertion of correctness check code sequences in accordance with the method of the present invention.
Figure 2:
Figure 2:
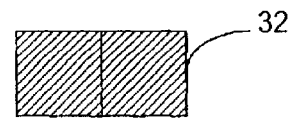
Figure 2:
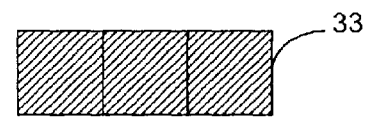
Figure 2:
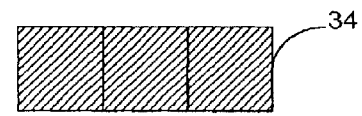
Figure 2:
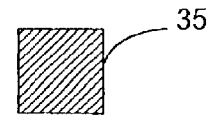

Once the task of initial code generation has been performed by the compiler, the task of initial instruction scheduling is performed. FIG. 2 illustrates the results of performance of initial instruction scheduling. The method and apparatus of the present invention preferably are utilized in connection with a processor that issues multiple instructions per cycle. As shown in FIG. 2, the number of instructions issued per cycle is N+1, where N is some positive integer. For the purposes of describing the present invention, it will be assumed that N is equal to 5. Therefore, the number of instructions issued per cycle will be assumed to be 6, as indicated by the 6 blocks in each of rows 12–25 of the initial instruction schedule shown in FIG. 2.

The shaded blocks in rows 12–25 correspond to instruction slots that are being utilized, i.e., instruction slots that are not spare. The white blocks in rows 12–25 of the instruction schedule correspond to spare instruction slots. The check code sequences 31–35 shown in FIG. 2 correspond to code sequences associated with correctness check functions. It can be seen from FIG. 2 that the initial instruction schedule 10 is separate from the correctness check code sequences 31–35. This results from the separation of the conditional instructions and the main instruction stream when initial code generation is performed.

Once the initial instruction schedule has been generated, the compiler determines where spare instruction slots exist in the initial instruction schedule. The manner in which compilers determine the existence of spare instruction slots in an instruction schedule is generally known in the art. Each correctness check code sequence is associated with a particular sequence of instructions which are contained in the initial construction schedule 10. The compiler knows the relationship between the correctness check code sequences and the main stream code sequences of the initial instruction schedule 10. Therefore, the compiler is capable of determining which correctness check code sequences can be inserted into particular spare instruction slots of the initial instruction schedule 10.

Each instruction slot is not fully general. For example, certain instruction slots may accommodate only memory instructions whereas others may accommodate only floating point instructions or integer instructions. The compiler understands which slots are capable of accommodating certain types of instructions. For each correctness check code sequence 31–35, the compiler determines whether enough spare instruction slots exist to accommodate the correctness check code sequence. If, for any particular correctness check code sequence, not enough spare instruction slots exist, the correctness check code sequence will be discarded. On the other hand, if enough suitable spare instruction slots exist to accommodate a particular correctness check code sequence, the particular correctness check code sequence will be inserted into the spare instruction slots.

For simplicity and ease of illustration, it will be assumed that each correctness check code sequence shown in FIG. 2 can only be inserted into the instruction slots located in the row across from it in the instruction schedule 10 shown in FIG. 2. Therefore, correctness check code sequence 31 may only be inserted into row 12 of the instruction schedule 10 and only if enough spare instruction slots exist in row 12 to accommodate sequence 31. However, in reality, the instructions of a particular correctness check code sequence could be inserted into different rows of the initial instruction schedule 10 provided all dependencies are satisfied. For example, if the correctness check code sequence corresponds to a comparison of variables x and y, the instructions of the correctness check code sequence must be inserted in such a way that the values of both of the variables x and y are available at the time that the comparison is to be performed in the instruction schedule. Those skilled in the art will understand that the compiler can determine which instructions of a particular correctness check code sequence can be inserted into particular spare instruction slots of the initial instruction schedule.

Figure 3:
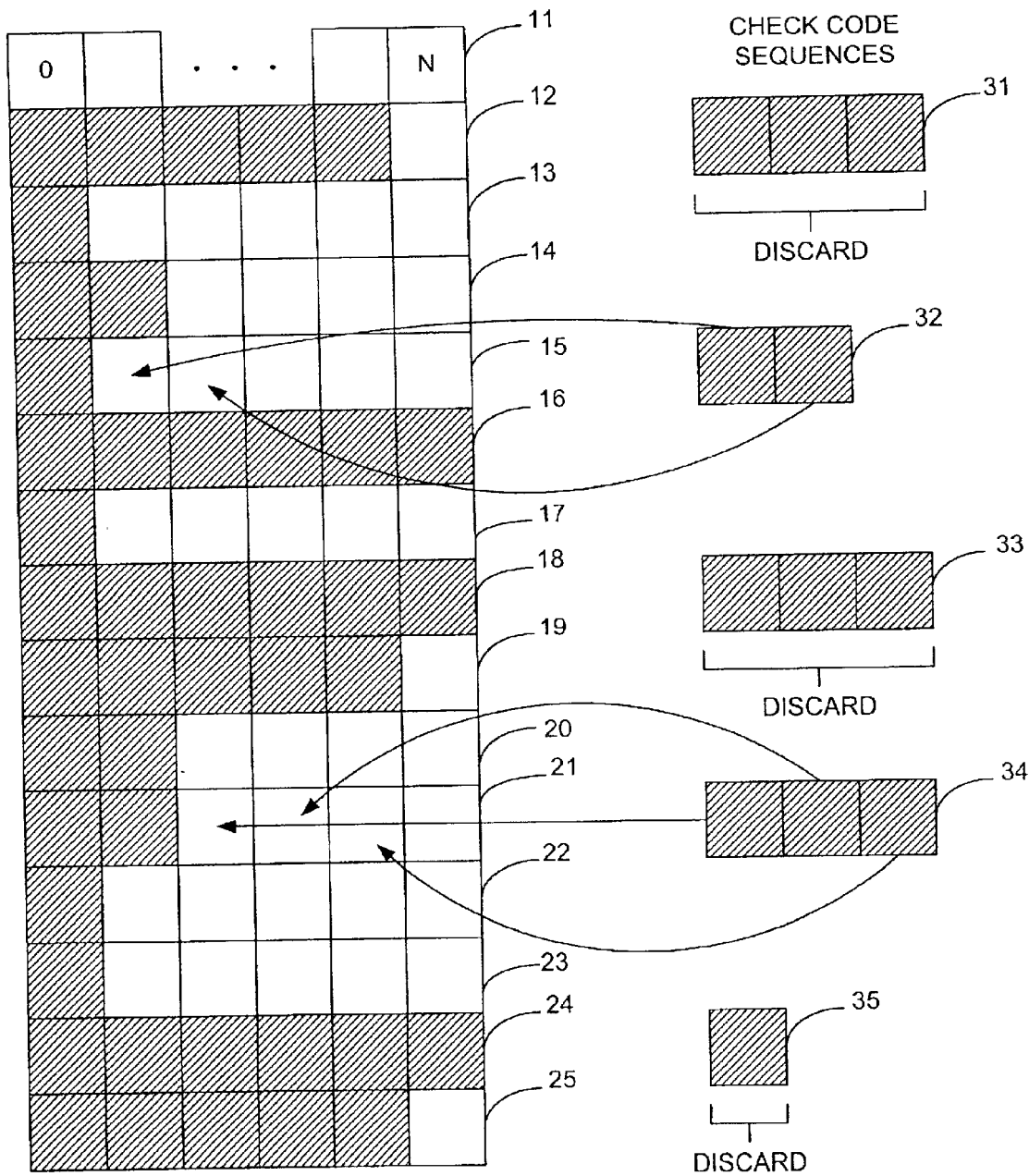
FIG. 3 illustrates the result of performance of final instruction scheduling by the compiler of the present invention during which certain correctness check code sequences are inserted into certain spare instruction slots contained in the initial instruction schedule.

FIG. 3 illustrates the insertion of correctness check code sequences into the instruction schedule during the generation of the final instruction schedule. The correctness check code sequences that are comprised of more instructions than can be accommodated by spare instruction slots are discarded. For example, correctness check code sequence 31 is comprised of three instructions, but row 12 of the instruction schedule has only one spare instruction slot. Therefore, correctness check code sequence 31 is discarded. In contrast, correctness check code sequence 32 is comprised of only two instructions. Since row 15 contains five spare instruction slots, the entire correctness check code sequence 32 can be accommodated. Therefore, the correctness check code sequence 32 is inserted into the instruction schedule. Similarly, correctness check code sequence 34 can be accommodated by the spare instruction slots contained in row 21 of the instruction schedule. On the other hand, correctness check code sequences 33 and 35 cannot be accommodated and, therefore, are discarded.

Again, the representation illustrated in FIG. 3 is simplistic and is only intended to illustrate that the entire correctness check code sequences must be capable of being accommodated by suitable spare instruction slots or it will be discarded. This ensures that insertion of correctness check code sequences into the instruction schedule will not cause the instruction schedule to be lengthened. Consequently, insertion of the correctness check code sequences into the instruction schedule will not result in a performance cost being incurred at run time.

Figure 4:
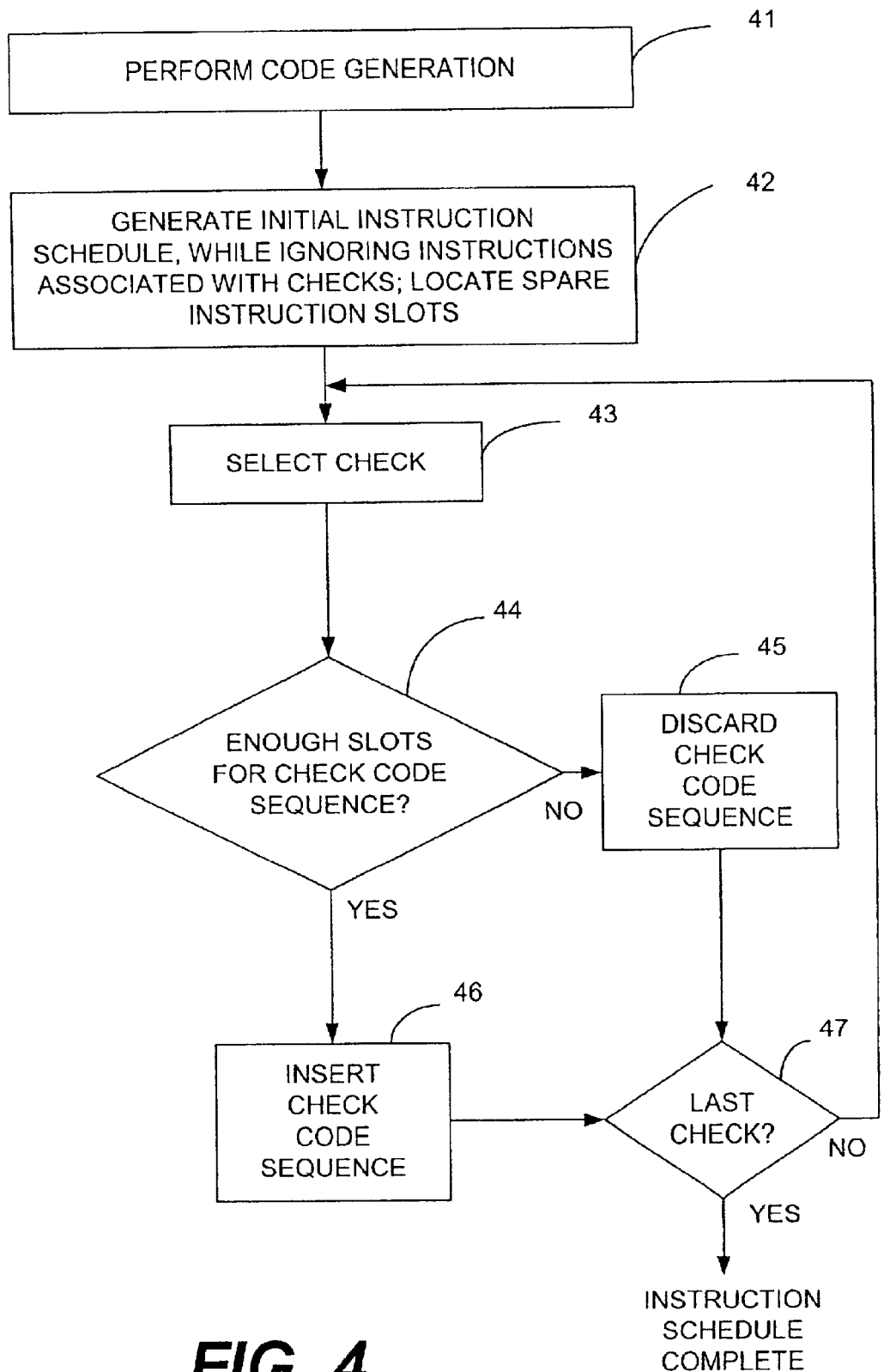
FIG. 4 illustrates the method of the present invention in accordance with the preferred embodiment for opportunistically utilizing spare instruction slots contained in the initial instruction schedule for correctness check code sequences.
Figure 5:
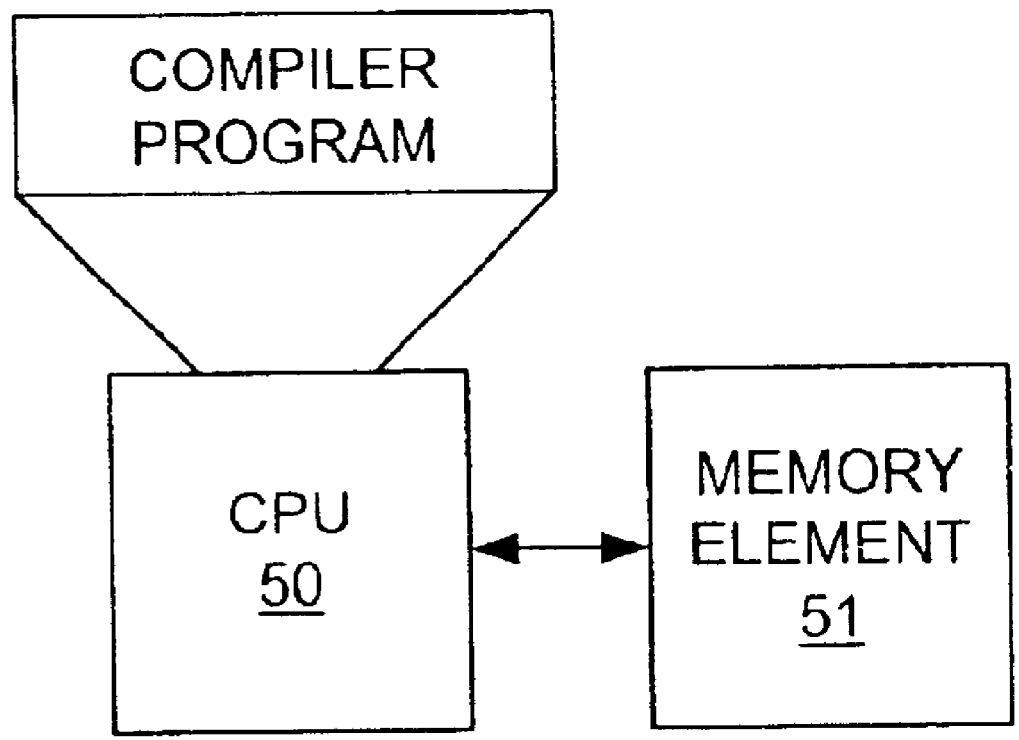
FIG. 5 illustrates the apparatus of the present invention, which comprises a central processing unit (CPU) 50 that is capable of being configured to execute the compiler program of the present invention.

FIG. 4 illustrates the method of the present invention performed by the compiler of the present invention in accordance with the preferred embodiment. Compilers generally are implemented in the form of computer programs that are executed on some type of hardware platform that is running some type of operating system. Therefore, in accordance with the preferred embodiment of the present invention, the compiler of the present invention comprises hardware configured to execute a compiler program, as shown in FIG. 5. FIG. 5 simply illustrates a central processing unit (CPU) 50, which is capable of being configured to execute the compiler program of the present invention, and which is in communication with a memory element 51 that stores instructions to be executed by the CPU 50.

However, those skilled in the art will understand that functions that are performed in software typically can also be performed solely in hardware. Therefore, the present invention is not limited to being performed in any specific hardware and/or software. Those skilled in the art will understand that the functions of the present invention can be implemented in a variety of forms.

With reference again to the flow chart shown in FIG. 4, the first step in the method of the present invention performed by the compiler is the code generation task, as indicated by block 41. As stated above, preferably the correctness check functions are included in the source code as conditions so that they will be treated specially by the compiler and kept separate from the main instruction stream, as shown in FIG. 1. It is not required that the correctness check functions be implemented in the source code in the form of conditions. This is merely one way of keeping the correctness check code sequences separate from the main instruction stream until the compiler has determined where correctness check code sequences can be inserted into the instruction schedule. Those skilled in the art will understand that there are other methods that can be used for maintaining the correctness check code sequences separate from the main instruction stream until the compiler has determined where appropriate spare instruction slots exist for insertion of the correctness check code sequences. Furthermore, it is not absolutely necessary that the correctness check code sequences be kept separate from the main instruction stream, although doing so simplifies the processes that need to be performed by the compiler.

Once the task of code generation has been performed, the initial instruction schedule is generated and the spare instruction slots are located, as discussed above with reference to FIGS. 2 and 3. This step is represented by block 42 in FIG. 4. Once the initial instruction schedule has been generated, the compiler begins selecting correctness check code sequences and determining whether or not enough spare instruction slots exist to accommodate the correctness check code sequences. These steps are represented by blocks 43–47. The compiler selects a check, as indicated by block 43, and determines whether or not enough spare instruction slots exist to accommodate the particular correctness check code sequence, as indicated by block 44. If not, the correctness check code sequence is discarded, as indicated by block 45. If enough spare instruction slots exist in the instruction schedule to accommodate the correctness check code sequence, the correctness check code sequence is inserted into the appropriate spare instruction slots in the instruction schedule, as indicated by block 46. This process continues until the compiler has determined whether each correctness check code sequence can be accommodated by spare instruction slots in the instruction schedule, as indicated by block 47 and the return from that block to block 43.

Of course, if the compiler determines at the step represented by block 42 that no spare instruction slots exist, the tasks represented by blocks 43–47 need not be performed by the compiler. Similarly, if the compiler determines that no more spare instruction slots exist in the instruction schedule after a correctness check code sequence has been inserted into the instruction schedule, the compiler need not continue checking to determine whether subsequent correctness check code sequences can be inserted into the instruction schedule. Also, the steps represented by blocks 43–47 do not necessarily have to be performed separately or in the order shown in FIG. 4. For example, if a compiler determines that only three spare instruction slots exist and that only one correctness check code sequence can be accommodated by the three spare instruction slots, the compiler may simply insert the correctness check code sequence and then resume its normal operations. In other words, each correctness check code sequence will not have to be analyzed to determine whether or not it can be inserted and a determination will not need to be made as to whether or not the last correctness check code sequence has bee encountered and analyzed by the compiler.

Once the compiler has allocated correctness check code sequences to all of the spare instruction slots capable of accommodating the correctness check code sequences, the compiler may perform other operations, such as optimization. The compiler then executes the compiled program and any correctness check code sequences included in the compiled program will be performed without incurring a performance cost. Certain functions that need to be performed by a compiler in order to perform the method of the present invention are already performed by known compilers. For example, locating spare instruction slots and determining whether a particular instruction or sequence of instructions are capable of being accommodated by the spare instruction slots is a function currently performed by some known compilers. Therefore, configuring a compiler to perform the functions of the present invention should not be overly difficult.

It should be noted that the present invention has been described with reference to preferred embodiments, but that the present invention is not limited to these embodiments. Those skilled in the art will understand that the embodiments discussed above can be modified without deviating from the scope of the present invention. As stated above, various functions performed in accordance with the present invention are capable of being performed in a variety of ways. Therefore, the present invention is not limited to any particular manner of performing these functions or to any particular physical implementation for performing these functions.

What is claimed is:

1. An apparatus for performing correctness checks, the apparatus comprising:
   logic configured to receive a first set of instructions comprising one or more conditional code sequences that when executed direct one or more correctness checks;
   logic configured to generate an initial instruction schedule and a conditional instruction stream from the first set of instructions, such that the initial instruction schedule is devoid of said conditional code sequences and such that the conditional code sequences of the conditional instruction stream are associated with a corresponding set of one or more instructions in the initial instruction schedule;
   logic configured to evaluate the initial instruction schedule to determine whether the initial instruction schedule includes spare instruction slots into which said conditional code sequences can be inserted into the initial instruction schedule such that a final instruction schedule would not require a longer run time than the initial instruction schedule; and
   logic configured to generate the final instruction schedule responsive to the initial instruction schedule, the conditional instruction stream, and the logic configured to evaluate such that identified conditional code sequences are inserted into spare instruction slots.

2. The apparatus of claim 1, wherein correctness checks are configured to evaluate at least one of a value, a range of values, and a relationship between values after execution of the corresponding instructions in the initial instruction schedule.

3. The apparatus of claim 1, wherein said logic configured to generate an initial instruction schedule and a conditional instruction stream from the first set of instructions is responsive to an input provided to a compiler.

4. The apparatus of claim 1, wherein said logic configured to evaluate the initial instruction schedule discards one or more conditional code sequences within the conditional instruction stream that when inserted into a final instruction schedule would result in a final instruction schedule with a run time greater than a run time of the initial instruction schedule.

5. The apparatus of claim 1, wherein said logic configured to evaluate the initial instruction schedule identifies one or more conditional code sequences within the conditional instruction stream for insertion into the initial instruction schedule.

6. The apparatus of claim 5, wherein said logic configured to evaluate the initial instruction schedule identifies one or more conditional code sequences having a length that exceeds the length of a corresponding set of one or more spare instruction slots in the initial instruction schedule.

7. The apparatus of claim 1, wherein said logic configured to generate the final instruction schedule inserts one or more conditional code sequences associated with correctness checks into spare instruction slots of the initial instruction schedule.

8. An apparatus for performing correctness checks, the apparatus comprising:
   means for receiving a first set of instructions comprising one or more conditional code sequences that when executed direct one or more correctness checks;
   means for generating an initial instruction schedule and a conditional instruction stream from the first set of instructions, such that the initial instruction schedule is devoid of said conditional code sequences and such that code sequences of the conditional instruction stream are associated with a corresponding set of one or more instructions in the initial instruction schedule;
   means for evaluating the initial instruction schedule to determine whether the initial instruction schedule includes spare instruction slots into which said conditional code sequences can be inserted into the initial instruction schedule such that a final instruction schedule would not require a longer time than the initial instruction schedule; and
   means for inserting said conditional code sequences into the spare instruction slots to generate the final instruction schedule if enough spare instruction slots exist in the initial instruction schedule to accommodate said conditional code sequences.

9. The apparatus of claim 5, wherein correctness checks are configured to evaluate at least one of a value, a range of values, and a relationship between values after execution of the corresponding instructions in the initial instruction schedule.

10. The apparatus of claim 5, wherein said means for generating an initial instruction schedule and a conditional instruction stream from the first set of instructions is responsive to an input provided to a compiler.

11. A method for performing correctness checks, the apparatus comprising:
   receiving a first set of instructions comprising one or more conditional code sequences that when executed direct one or more correctness checks;
   generating an initial instruction schedule and a conditional instruction stream from the first set of instructions, such that the initial instruction schedule is devoid of said conditional code sequences and such that code sequences of the conditional instruction stream are associated with a corresponding set of one or more instructions in the initial instruction schedule;
   evaluating the initial instruction schedule to determine whether the initial instruction schedule includes spare instruction slots into which said conditional code sequences from the conditional instruction can be inserted into the initial instruction schedule such that a final instruction schedule would not require a longer time than the initial instruction schedule; and inserting said conditional code sequences into the spare instruction slots to generate the final instruction schedule when enough spare instruction slots exist in the initial instruction schedule to accommodate said conditional code sequences.

12. The method of claim 11, wherein evaluating the initial instruction schedule comprises comparing the run time length of one or more spare instruction slots with the run time length of a conditional code sequence associated with a corresponding portion of the initial instruction schedule.

13. The method of claim 11, wherein evaluating the initial instruction schedule further comprises discarding one or more conditional code sequences having a run time length greater than the run time of one or more spare instruction slots associated with a corresponding portion of the initial instruction schedule.

14. A computer program for performing correctness checks, the computer program being embodied on a computer-readable medium, the computer program comprising:

a first code segment configured to receive a set of instructions comprising one or more conditional code sequences that when executed direct one or more correctness checks;

a second code segment configured to generate an initial instruction schedule and a conditional instruction stream from the set of instructions, such that the initial instruction schedule is devoid of said conditional code sequences and such that the conditional code sequences of the conditional instruction stream are associated with a corresponding set of one or more instructions in the initial instruction schedule;

a third code segment configured to evaluate the initial instruction schedule to determine whether the initial instruction schedule includes spare instruction slots into which said conditional code sequences can be inserted into the initial instruction schedule such that a final instruction schedule would not require a longer run time than the initial instruction schedule; and a fourth code segment configured to insert conditional code sequences into the spare instruction slots when sufficient spare instruction slots exist in the initial instruction schedule to accommodate said conditional code sequences in the final instruction schedule.

15. The computer program of claim 14, wherein said second code segment generates a conditional instruction stream comprising correctness checks that evaluate at least one of a value, a range of values, and a relationship between values after execution of corresponding instructions in the initial instruction schedule.

* * * * *